(12) United States Patent
Spence et al.

(10) Patent No.: US 6,704,454 B1
(45) Date of Patent: Mar. 9, 2004

(54) METHOD AND APPARATUS FOR IMAGE PROCESSING BY GENERATING PROBABILITY DISTRIBUTION OF IMAGES

(75) Inventors: Clay Douglas Spence, Princeton Junction, NJ (US); Lucas Parra, Princeton, NJ (US)

(73) Assignee: Sarnoff Corporation, Princeton, NJ (US)

(*) Notice: Subject to any disclaimer, the term of this patent is extended or adjusted under 35 U.S.C. 154(b) by 561 days.

(21) Appl. No.: 09/589,715

(22) Filed: Jun. 8, 2000

Related U.S. Application Data
(60) Provisional application No. 60/145,319, filed on Jul. 23, 1999.

(51) Int. Cl.[7] .................................................. G06K 9/36
(52) U.S. Cl. ...................................................... 382/240
(58) Field of Search ................................. 382/232, 236, 382/238–240, 242, 248, 250; 358/432, 433, 261.2, 261.3; 348/384.1, 394.1–395.1, 400.1–404.1, 407.1–416.1, 420.1–421.1, 425.2, 430.1–431.1; 375/240.02–240.03, 240.11–240.16, 240.18–240.2, 240.22–240.25; 341/51, 63, 65, 67, 79, 107; 708/300, 308, 313, 317, 400–405, 203

(56) References Cited

U.S. PATENT DOCUMENTS

| | | | | |
|---|---|---|---|---|
| 4,751,742 A | * | 6/1988 | Meeker ....................... 382/248 |
| 5,179,441 A | * | 1/1993 | Anderson et al. .............. 358/88 |
| 5,321,776 A | * | 6/1994 | Shapiro ...................... 382/240 |
| 5,661,822 A | * | 8/1997 | Knowles et al. ............. 382/233 |
| 5,671,294 A | * | 9/1997 | Rogers et al. ............... 382/228 |
| 5,799,100 A | * | 8/1998 | Clarke et al. ................ 382/132 |
| 5,835,034 A | * | 11/1998 | Seroussi et al. ............... 341/65 |
| 5,995,668 A | * | 11/1999 | Corset et al. ................ 382/233 |
| 6,018,728 A | * | 1/2000 | Spence et al. ................. 706/20 |
| 6,049,630 A | * | 4/2000 | Wang et al. ................. 382/239 |
| 6,141,446 A | * | 10/2000 | Boliek et al. ............... 382/233 |
| 6,263,103 B1 | * | 7/2001 | Freeman et al. ............. 382/173 |
| 6,324,532 B1 | * | 11/2001 | Spence et al. ................. 706/27 |
| 6,380,934 B1 | * | 4/2002 | Freeman et al. ............. 345/419 |
| 6,501,861 B1 | * | 12/2002 | Cho et al. ................... 382/243 |
| 6,549,666 B1 | * | 4/2003 | Schwartz .................... 382/233 |

OTHER PUBLICATIONS

Crouse et al. "Wavelet–Based Statistical Signal Processing Using Hidden Markov Models" IEEE Transactions on Signal Processing, vol. 46, No. 4, pp. 886–902. Apr. 1998.

* cited by examiner

*Primary Examiner*—Jose L. Couso
(74) *Attorney, Agent, or Firm*—William J. Burke (57) ABSTRACT

An apparatus and a concomitant method for modeling local and non-local information in an image to compute an image probability distribution for the image is disclosed. In one embodiment, such an image probability distribution is determined in an object recognition system.

18 Claims, 4 Drawing Sheets

METHOD AND APPARATUS FOR IMAGE PROCESSING BY GENERATING PROBABILITY DISTRIBUTION OF IMAGES

This application claims the benefit of U.S. Provisional Application No. 60/145,319 filed Jul. 23, 1999, which is herein incorporated by reference.

This invention was made with U.S. government support under NIDL contract number NMA 202-97-D-1003, and ARMY contract number DAMD17-98-1-8061. The U.S. government has certain rights in this invention.

The invention relates generally to an apparatus and a concomitant method for image processing and, more particularly, to an apparatus and method using a model for computing probability distributions of images, which, in turn, can be applied to image processing applications, such as object recognition, object classification and the like.

BACKGROUND OF THE DISCLOSURE

Current approaches to object recognition estimate the probability of a particular class given an image, Pr(class|image), i.e., the probability that, given an image, it is an image of an object of a particular class. For example, in mammography, given an image, the Pr(class|image) can be a probability of a class, i.e., the class can be a "tumor" or "non-tumor." However, such an approach is suspect to erroneous classification of an image. Additionally, this approach will likely fail to account for the detection and rejection of unusual images.

To account for unusual images and reduce erroneous classification of images, the object recognition approaches require a better model for an image probability distribution or a probability distribution of images. Given this image probability distribution, it is possible to provide enhanced object recognition, by training a distribution for each object class and using Baye's Rule of conditional probability to obtain Pr(class|image), where Pr(class|image)=Pr(image|class)Pr(class)/Pr(image).

Current image distribution methods have produced positive results for textures, but fail to adequately capture the appearance of more structured objects in the image. Namely, these methods merely capture local dependencies or correlations in images, but fail to capture non-local and long-range dependencies. As such, these methods fail to adequately represent the image probability distribution or the probability distribution of images.

Therefore, a need exists in the art for an apparatus and a concomitant method that provides an image probability distribution that captures non-local and long-range dependencies of an image. Such an image probability distribution would enhance a variety of image processing applications. For example, the image probability distribution would enable the detection and rejection of unusual images in object recognition systems.

SUMMARY OF THE INVENTION

The present invention is an apparatus and method to compute an image probability distribution or a probability distribution of images. Namely, the present invention performs Hierarchical Image Probability (HIP) modeling to provide the image probability distribution.

More specifically, the present invention decomposes the input image into a low-pass, i.e., gaussian, pyramid from which one or more feature pyramids and subsampled feature pyramids are derived. These pyramids form a hierarchical representation that models local information of the image. Next, the non-local information in the image are modeled with a plurality of labels or hidden variables. The plurality of labels and at least one of the feature and subsampled feature pyramids are used to compute the image probability distribution. In one embodiment of the invention, the image probability distribution is used in an object detection system.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
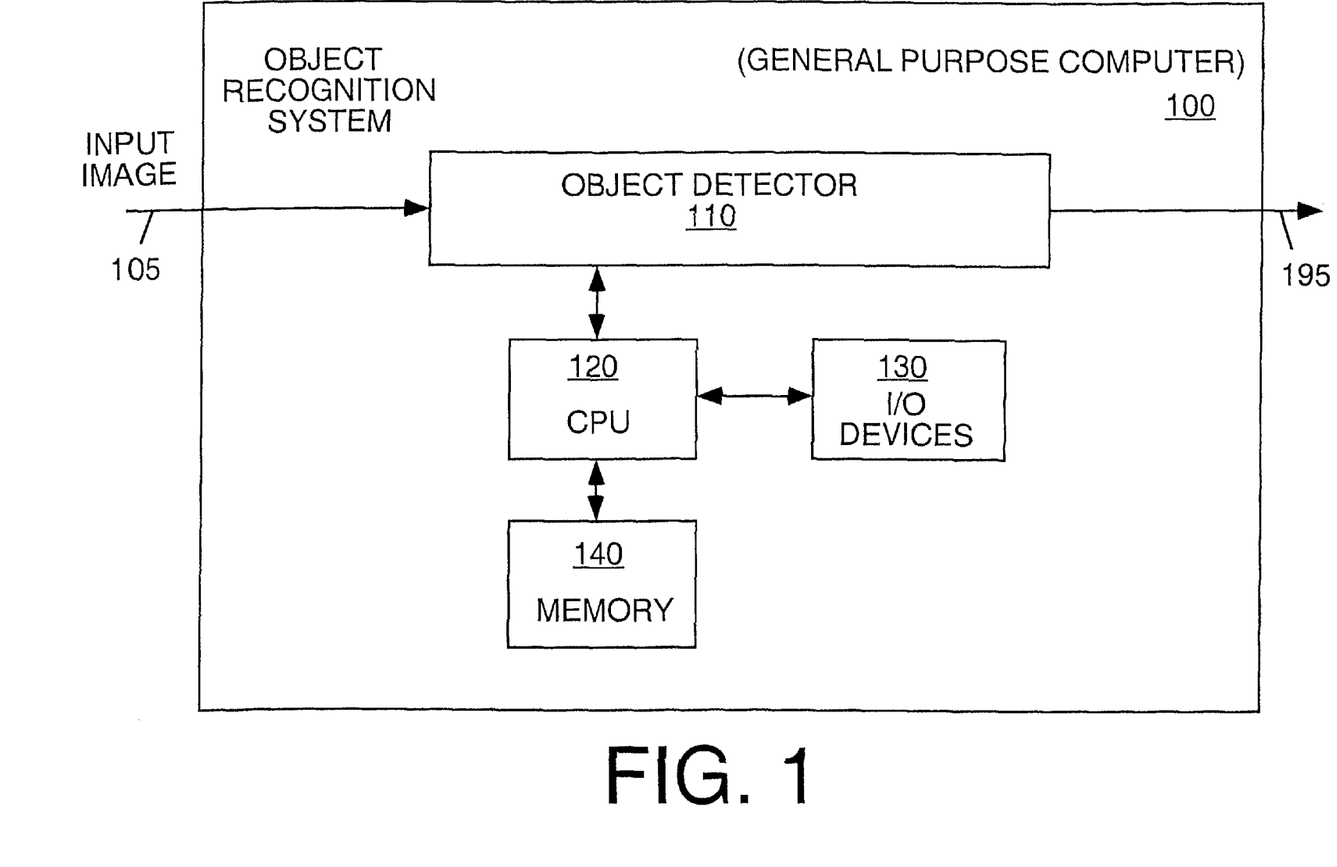
FIG. 1 illustrates a block diagram of an object recognition system of the present invention for detecting an object within an image.

FIG. 1 depicts a block diagram of the object recognition system 100 of the present invention. One embodiment of the object recognition system 100 is implemented using a general purpose computer that is used to perform object detection. Specifically, the image recognition system 100 comprises an object detector 110, a central processing unit (CPU) 120, input and output (I/O) devices 130, and a memory unit 140.

Figure 2:
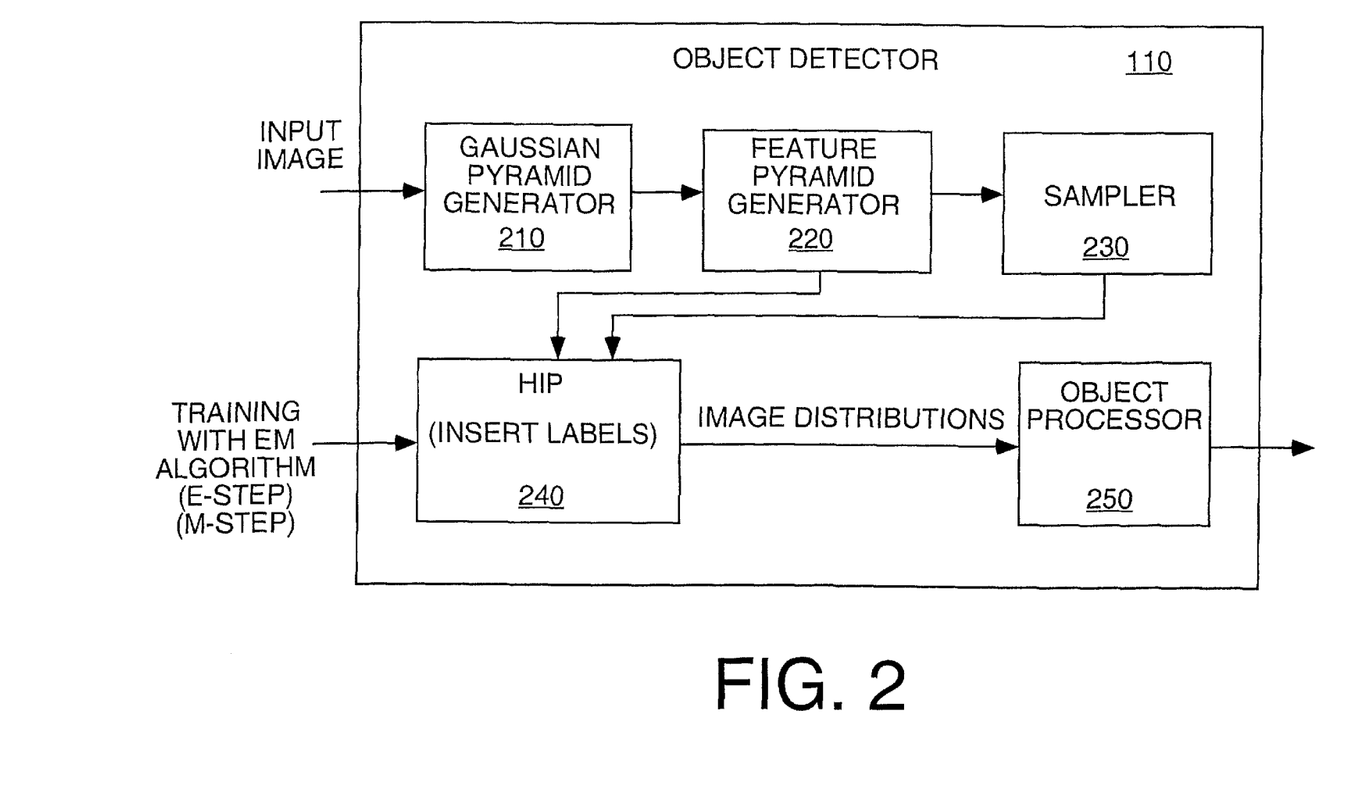
FIG. 2 illustrates a block diagram of an object detector of the present invention.

The object detector 110 receives an input image at path 105 and determines a novel image probability distribution or a probability distribution of images. The input image may comprise a single image or an image sequence. In contrast to the prior art, the image probability distribution of this invention captures the non-local and long-range dependencies of objects within the image. The object detector 110 then uses the image probability distribution to perform object recognition, where the result of this object recognition is transmitted at path 195 to an encoder or storage device, for subsequent processing.

To perform object detection, the object detector 110 may use two image probability distributions, one for images of objects of a particular class and the other for images containing other things. If the probability of the class is high enough, i.e., above a predetermined threshold, then the object detector 110 identifies the object as a member of that class. In another embodiment, the object detector 110 may detect and reject unusual images. However, if the input image is too unusual, the result from the object detector would be suspect, since the training data included, few, if any, images in like the input image. The object detector 110 and the resulting image probability distribution are further described below in connection with FIG. 2.

The central processing unit 120 generally performs the computational processing in the object recognition system 100. In this embodiment, the central processing unit 120 loads software from the memory unit 140, executes this software to obtain the image probability distribution at the input image, and performs object recognition from the image probability distribution. The central processing unit 120 may also receive and transmit signals to the input/output devices 130.

The object detector 110 discussed above is a physical device that is coupled to the CPU 120 through a communication channel. Alternatively, the object detector 110 can be represented by one or more software applications, where the software is loaded from a storage medium, (i.e., a magnetic or optical drive or diskette) and operated by the CPU in the memory 204 of the computer. As such, the object detector 110 (including associated data structures) of the present invention can be stored on a computer readable medium, i.e., RAM memory, magnetic or optical drive or diskette and the like. The object detector 110 can also be represented by a combination of software and hardware, i.e., using application specific integrated circuits (ASIC).

Although the present invention is implemented in terms of an object recognition system, the resulting image probability distribution can be adapted to other image processing functions. Such image processing functions include compression, noise suppression, resolution enhancement, interpolation and fusion of multiple images. For example, in the context of compression, an image processing system may use fewer bits for images having a higher probability distribution, thereby implementing variable length coding on an image level. As another example, in the context of noise suppression, if the image probability distribution indicates an unusual image corrupted by noise, the image processing system would estimate such an image without noise.

Figure 3:
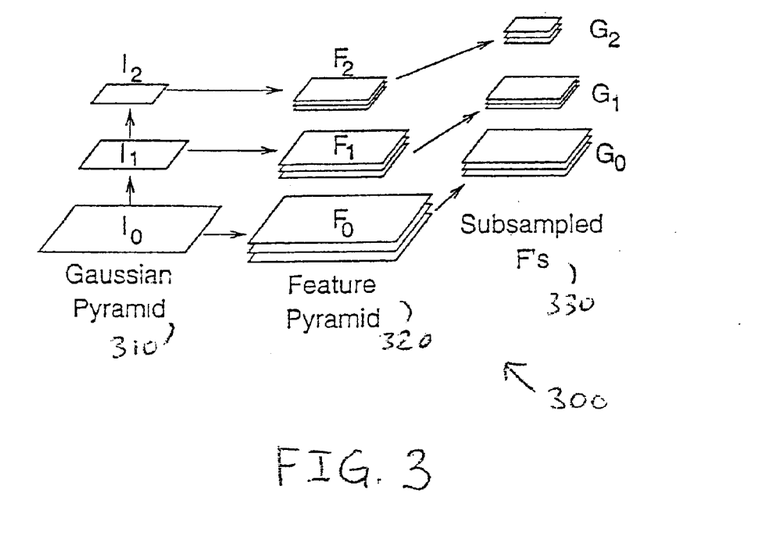
FIG. 3 illustrates representations of the image received in the object detector of FIG. 2.

FIG. 2 illustrates a block diagram of an object detector 110 in the object recognition system 100 of FIG. 1. FIG. 2 should be read in conjunction with FIG. 3, which illustrates the pyramid representations 300 of the input image. In FIG. 2, the object detector 110 comprises a gaussian pyramid generator 210, a feature pyramid generator 220, a pyramid sampler 230, a hierarchical image probability (HIP) module 240 and an object processor 250. In FIG. 3, the input image is decomposed into a gaussian pyramid 310, from which a feature pyramid 320 and a subsampled feature pyramid 330 are generated.

The gaussian pyramid generator 210 decomposes the received input image into a gaussian pyramid 310 of images having L+1 levels of different resolution. Initially, the gaussian pyramid generator 210 receives the input image, $I_0$, which represents the lowest level of the gaussian pyramid 310. The gaussian pyramid generator 210 blurs the received input image with a low pass filter, and then subsamples or otherwise decomposes the input filtered image to generate a corresponding image $I_1$ of lower resolution. The gaussian pyramid generator 210 repeats this decomposition to generate successive levels of the gaussian pyramid 310. The resulting gaussian pyramid 310 is a set of images $I_0, I_1, \ldots, I_L$ of decreasing resolution that represents the input image into hierarchical levels of resolution or scale. Note that although the gaussian pyramid generator 210 is preferably described in the context of generating gaussian pyramids, the gaussian pyramid generator 210 may actually generate any type of low-pass pyramids including non-gaussian pyramids.

The feature pyramid generator 220 extracts features from the gaussian pyramid 310 to generate one or more feature pyramids 320. Specifically, at each level, l, of the gaussian pyramid 310, the feature pyramid generator 220 extracts a set of feature images, $F_l$, where the i-th such feature image within the set of feature images $F_l$ is $F_{l,i}$ and the pixel value at position x of the feature image $F_{l,i}$ is $f_{l,i}(x)$. The collection of pixel values for all i-th feature images in the set of feature images $F_l$ at a particular level l of the feature pyramid is a feature vector $f_l(x)$, where $f_l(x)=(f_{l,0}(x),f_{l,1}(x), \ldots)^T$ and T represents a matrix tranpose function. These feature vectors define information or some features of the input image. Additionally, these feature vectors capture local structures or dependencies in the input image, which may include the presence of particular objects within the input image.

After generating the feature pyramid 320, the pyramid sampler 230 subsamples the feature images to generate one or more subsampled feature pyramids 330. Specifically, the pyramid sampler 230 subsamples the feature images at each level of the feature pyramid 320 to generate a set of subsampled feature images, $G_l$, where $l=0, \ldots, L-1$. As with each set of feature images $F_l$, the i-th such subsampled feature image within the set of subsampled feature images $G_l$, is $G_{l,i}$ and the pixel value at position x of the feature image $G_{l,i}$ is $g_{l,i}(x)$. The collection of pixel values for all i-th subsampled feature images in the set of subsampled feature images $G_l$ at a particular level l of the feature pyramid is a feature vector $g_l(x)$ where $g_l(x)=(g_{l,0}(x),g_{l,1}(x), \ldots)^T$. These subsampled feature vectors may also capture local structure or dependencies of the input image.

The gaussian pyramid 310, feature pyramid 320 and subsampled feature pyramid 330 are separate hierarchical representations of the input image. In this embodiment, the HIP module 240 receives a feature representation of the input image from the feature pyramid generator 220 and a subsampled feature representation at the input image from the pyramid sampler 230. The HIP module 240 determines the image probability distribution from these representations using a HIP model. This image probability distribution is further defined in detail below.

The image probability distribution may be expressed as a coarse to fine factoriztion having the form $Pr(I) \sim Pr(F_0|F_1) Pr(F_{1|F_2}) \ldots$ where $F_l$ is the set of feature images at pyramid level l. In this coarse to fine factorization, the higher resolution features are dependent or conditioned upon lower resolution features associated with larger-scale structures.

As previously mentioned, each gaussian image $I_l$, each set of feature images $F_l$ and each set of subsampled feature images $G_l$ are representations of the input image I. Note that the images in $G_l$ and the image $I_{l+1}$ are each derived from the image $I_l$ and have the same dimensions. As such, the transformation from $I_l$ to $G_l$ and $I_{l+1}$ can be expressed as a mapping, $\zeta_l:I_l \rightarrow \tilde{G}_l$, where $\zeta_l$ denotes the mapping function, and $\tilde{G}_l$ is the set of images containing $G_l$ and the images in $I_{l+1}$.

Consider the case where the mapping $\zeta_0:I_0 \rightarrow \tilde{G}_0$ is invertible such that $\zeta_0$ is viewed as a change of variables. If $I_0$ and $\tilde{G}_0$ are represented by distributions on a space, the distributions in two different coordinate systems are related by a Jacobian determinant $|\zeta_0|$, where $Pr(I_0)=|\zeta_0|Pr(\tilde{G}_0)$. However, $\tilde{G}_0=(G_0,I_1)$, so factoring $Pr(\tilde{G}_0)$ yields $Pr(I_0)=|\zeta_0|Pr(G_0|I_1)Pr(I_1)$. If the mapping $\zeta_1$ is invertible for all $l \in \{0, \ldots, L-1\}$, then the above change of variables and factor procedure can be repeated to yield:

$$Pr(I) = \left[\prod_{l=0}^{L-1} |\xi_l| Pr(G_l \mid I_{l+1})\right] Pr(I_L) \quad (1A)$$

In Equation 1A, the image probability distribution is a product of the probability distribution over images at some lowest-resolution gaussian pyramid level, $Pr(I_L)$, the probability distributions at all higher resolution levels of the sub-sampled feature images at that level conditioned on the image from the next lower-resolution level in the gaussian pyramid, and a proportionality constant that is independent with respect to the image. The proportionality constant is the product of the Jacobian determinants of the mappings from the gaussian pyramid levels to the sub-sampled feature images and the next lower-resolution gaussian pyramid level.

However, $Pr(G_l|I_{l+1})$ is still a complicated probability distribution on a high-dimensional space. To simplify the modeling of the individual probability terms, it is desired to factor $Pr(G_l|I_{l+1})$ over positions occupied by the individual feature vectors. Such factoring over position would break down $Pr(G_l|I_{l+1})$ into a product of many simpler probability distributions, each over a relatively low dimensional space.

As an initial consideration, replacing $I_{l+1}$ with mapped components $G_{l+1}$ and $I_{l+2}$ is a possibility, since $G_{l+1}$ and $I_{l+2}$ together contain the same information as $I_{l+1}$. However, in order to factor over positions, it is desirable to perform conditioning on images that are the same size as $G_l$. So replace $G_{l+1}$ with $F_{l+1}$, since both are derived from $I_{l+1}$, i.e. $I_{l+1}$, $(G_{l+1}, I_{l+2})$ and $(F_{l+1}, I_{l+2})$ all carry the same information. With $I_{l+2}$ carrying only the local average brightness and being smaller than $G_l$, the conditioning on $I_{l+2}$ is dropped. After replacing $Pr(G_l|I_{l+1})$ with $Pr(G_l|F_l)$ and factoring over positions, the image probability distribution reduces to:

$$Pr(I) \sim \prod_l \prod_{x \in I_{l+1}} Pr(g_l(x) \mid f_{l+1}(x)) \quad (1B)$$

where $g_l(x)$ is the subsampled feature vector at position x of level l of the subsampled feature pyramid, and $f_{l+1}(x)$ is the feature vector at level l of the feature pyramid. Note that the position x of the feature and subsampled feature pyramids is defined with respect to $I_{l+1}$, the (l+1)th level of the gaussian pyramid.

In Equation 1B, the dependence of $g_l$ on $f_{l+1}$ expresses the persistance of image structures across different scales or resolutions, i.e., an edge is usually detectable in several neighboring pyramid levels. However, this factorization and conditioning of $g_l(x)$ on $f_l(x)$ is limited to capturing local dependencies across a small area on the image. As such, this factorization and conditioning cannot, by itself, capture some properties of real images. Namely, this factorization and conditioning fails to capture the dependence of a feature on large regions of a lower resolution image and the dependence between features at distant locations in the same resolution. These dependencies are respectively termed as "non-local dependencies" and "long-range dependencies."

The presence of objects in an image may create non-local and long-range dependencies therein. Such dependencies are not adequately captured in prior art image distributions. For example, the presence of a particular object may result in a certain kind of texture to be visible at some resolution. A local image structure at lower resolutions will not, by itself, contain enough information to infer the presence of an object. However, an entire image at lower resolutions may infer this presence of the object. This dependence of an object or a feature on such a large region is the non-local dependency in an image.

A particular class of object may result in a kind of texture across a large area of the image. If the object of this class is always present, then the texture is similarly present. However, if the object of this class is not always present (and cannot be inferred from lower resolution information), then the presence of a texture at one location in the image would infer the presence of this texture elsewhere in the image. The dependence between objects or features at distant locations in an image is the long-range dependency in the image.

To capture these non-local and long-range dependencies within the image, the HIP module 240 applies hidden variables on the image. To ensure a more compact image probability distribution, these hidden variables should constrain the variability of features at the next finer scale or resolution. The collection of hidden variables is denoted as A, where conditioning on A allows the image probability distributions over the feature vectors to factor over position. The resulting expression for the image probability distribution is:

$$Pr(I) \propto \sum_A \left\{ \prod_{l=0}^{L-1} \prod_{x \in I_{l+1}} Pr(g_l(x) \mid f_{l+1}(x), A) \right\} Pr(I_L \mid A) Pr(A) \quad (2)$$

where $G_l(x)$ is the subsampled feature vector at position x of level l of the subsampled feature pyramid, and $f_{l+1}(x)$ is the feature vector at level l of the feature pyramid, $I_L$ is the highest level (lowest resolution) of the gaussian pyramid, and A is the collection of hidden variables.

In Equation 2, the image probability distribution is a sum, over some set of hidden variables, of the product of the distribution over the hidden variables times a factor for each level in a pyramid. At the highest, i.e., lowest resolution, pyramid level, the factor is the probability distribution of images in the gaussian pyramid at that level conditioned on the hidden variables. At all other levels in the pyramid, the factor is the product over each position in the level of the probability distribution of the sub-sampled feature vector at that position and level, conditioned on the feature vector at that position from the next lower resolution level and on the hidden variables. The same proportionality factor previously described with respect to Equation 1A also applies to Equation 2.

Equation 2 can be applied to any image probability distribution, since the structure of the hidden variables A, Pr(A) and $Pr(I_L|A)$ is broadly represented. However, a more specific structure for the hidden variables can be defined. In a preferred embodiment, the structure of the hidden variables is selected such that it would preserve the conditioning of higher-resolution information on coarser-resolution information and the ability to factor the collection of hidden variables A over positions.

Figure 4:
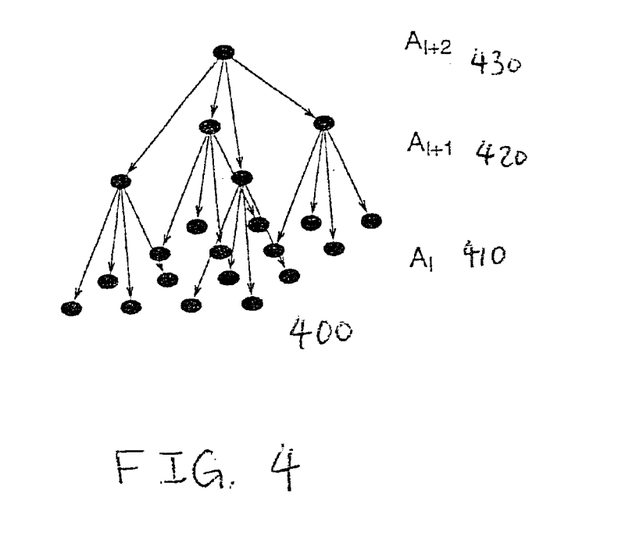
FIG. 4 illustrates a tree structure for a collection of labels or hidden variables.

FIG. 4 shows a tree structure 400 for the collection of hidden variables, A. The tree structure 400 illustrates the conditional dependency between hidden variables or labels applied within the HIP module 240. Such a tree structure is a label pyramid having successive levels of label images $A_l$ 410, $A_{l+1}$ 420 and $A_{l+2}$ 430, where each label image is represented by a plurality of labels or hidden variables $a_l(x)$. If the feature pyramid 320 is subsampled by a factor of two in two dimensions, the tree structure 400 reduces to a quadtree structure. As such, each parent label of such a quadtree structure has four child labels.

Inserting the above hidden variable structure into Equation (2), the image probability distribution is refined as follows:

$$Pr(I) \propto \sum_{A_0,\ldots,A_{L-1}} \left\{ \prod_{l=0}^{L-1} \prod_{x \in I_{l+1}} [Pr(g_l(x)|f_{l+1}(x), a_l(x))Pr(a_l(x)|a_{l+1}(x))] \right\} Pr(I_L) \quad (3)$$

where $G_l(x)$ is the subsampled feature vector at position x of level 1 of the subsampled feature pyramid, $f_{l+1}(x)$ is the feature vector at level 1 of the feature pyramid, $A_l$ is the label image at level 1 of the label pyramid, $a_l(x)$ is the label or hidden variable at position x of level 1 of the label pyramid, $a_{l+1}(x)$ is the label at position x of level l+1 of the label pyramid, and 1 ranges between levels 0 and L−1.

Equation 3 expresses the image probability distribution over images as the sum over a set of hidden variables over levels in a pyramid of certain factors. For each position x in the sub-sampled feature images at level 1, there is one hidden variable $a_l(x)$ that is an integer in some range. At the highest, i.e., lowest resolution, pyramid level, the factor is the probability distribution of images in the gaussian pyramid at that level. At all other levels in the pyramid, the factor is the product over each position in the level of the probability distribution of the sub-sampled feature vector at that position and level, conditioned on the feature vector at that position from the next lower resolution level and on the hidden variable at that level and position times the probability of the hidden variable at the parent position at the next lower-resolution pyramid level. The proportionality factor in Equations 1A and 2 also applies to Equation 3.

Note that for l=L−1, the factor reduces to $\Pi_x Pr(g_{L-1}(x)|f_L(x), a_{L-1}(x)) Pr(a_{L-1}(x))$, since $a_L(x)$ does not exist. In another embodiment, L is chosen large enough such that $I_L$ is a single pixel. In this case, $F_L$ has all zero pixels for most choices of features. This eliminates the need to depend on $f_L(x)$, so the factor is further reduced to $\Pi_x Pr(g_{L-1}(x)|a_{L-1}(x))Pr(a_{L-1}(x))$.

In Equation 3, $a_l(x)$ is conditioned on $a_{l+1}(x)$ at the parent pixel of position x. This parent-child relationship follows from sub-sampling of the feature pyramid. For example, if the feature image, $F_l$ is sub-sampled by two in each direction to obtain $G_l$, then the hidden variable $a_l$ at (x,y) at level l is conditioned on $a_{l+1}$ at ($\lfloor x/2 \rfloor, \lfloor y/2 \rfloor$), where $\lfloor\ \rfloor$ represents a floor function that represents the next lowest integer of the argument. The subsampling over the feature pyramid yields a corresponding tree structure for the hidden variables. The tree structure is a probabilistic tree of discrete variables, which is a particular kind of belief network.

Although the present invention uses hidden variables that depend on its parent, it should be understood other dependencies are possible and are contemplated within the scope of the invention. For example, the hidden variables may depend on other hidden variables at the same level.

After applying the hidden variables to the input image, the HIP module 240 uses an EM (expectation-maximization) method to train the HIP model. Specifically, the EM method comprises separate E (expectation) and M (maximization) steps. In the E-step, for a given set of parameters and observations, the HIP module 240 computes the expectations of a log-likelihood function over the hidden variables. In the M-step, the HIP module 240 uses these expectations to maximize the log-likelihood function. The E and M steps for this invention are represented as:

$$E-step: \quad Q(\theta|\theta^t) = \sum_A Pr(A|I, \theta^t) \ln Pr(I, A|\theta) \quad (4)$$

$$M-step: \quad \theta^{t+1} = \arg\max_\theta Q(\theta|\theta^t) \quad (5)$$

$M$-step: $\theta^{t+1} = \arg_\theta \max Q(\theta|\theta^t)$ \quad (5)

where Q is the log-likelihood function, θ is the set of parameters in the HIP model and t is the current iteration step of the EM method.

Implementing the HIP model requires the computation of expectations over hidden variables or labels. This involves a determination of upward and downward probabilities. In the following discussion, the M-step is first presented, followed by the E-step, and then followed by the determination of these upward and downward probabilities.

In the M-step, parameters are selected to maximize the log-likelihood function $Q(\theta|\theta^t)$ previously determined from the E-step. The selected parameters are then used to determine the image probability distribution, Pr(I).

Equation (6) shows the log-likelihood function to be maximized in the M-step. This is obtained by inserting Equation (3) into Equation (4):

$$Q(\theta|\theta^t) = \sum_A Pr(A|I, \theta^t) \sum_{l=0}^{L} \sum_x \ln Pr(g_l(x), a_l(x)|f_{l+1}(x), a_{l+1}(x), \theta) \quad (6)$$

$$= \sum_{l=0}^{L} \sum_x \sum_{a_l(x), a_{l+1}(x)} Pr(a_l(x), a_{l+1}(x)|I, \theta^t) \ln Pr(g_l(x), a_l(x)|f_{l+1}(x), a_{l+1}(x)) \quad (7)$$

From Equation (7), if the probability for all the parent-child label pairs, $Pr(a_l(x), a_{l+1}(x)|I,\theta^t)$ has been determined, the M-step reduces to a parameterization of $Pr(a_l(x)|a_{l+1}(x))$ and $Pr(g_l(x)|f_{l+1}(x), a_l(x))$. The determination of $Pr(a_l(x), a_{l+1}(x)|I,\theta^t)$ is achieved in E-step as discussed below. To achieve homogenous behavior across the image, the parameters are the same for all positions at a particular level or layer. However, these parameters may be different at different layers.

One parameterization of $Pr(a_l(x)|a_{l+1}(x))$ is as follows:

$$Pr(a_l|a_{l+1}) = \frac{\pi_{a_l,a_{l+1}}}{\sum_{a_l} \pi_{a_l,a_{l+1}}} \quad (8)$$

where $\pi_{a_l,a_{l+1}}$ is a parameter for the pair of labels, $a_l$ and $a_{l+1}$. The probability $Pr(a_l|a_{l+1})$ is normalized by the sum of the parameters over the child labels at a particular level 1.

Experiments have verified that Pr(g|f,a), the distribution of subsampled features conditioned on the features of the next layer, is well modeled by a mixture of Gaussian distributions with a linear dependency in the mean. As such, Pr(g|f,a) is modeled with a Gaussian distribution, where the parameters are indexed by the labels, and the dependency of the features is parameterized as a linear relationship in the mean.

$$Pr(g|f,a) = N(g, M_a f + \bar{g}_a, \Lambda_a) \tag{9}$$

where N ( ) represents a Gaussian distribution, and $M_a$, $\bar{g}_a$ and $\Lambda_a$ are parameters indexed by labels.

The parameters in Equations (8) and (9) are determined such that the log-likelihood in Equation (7) is maximized. Once these parameters are determined, the probabilities in Equations (8) and (9) are calculated to determine the probability distribution represented in Equation (3).

If the different features at a given pixel are orthogonal, then the use of diagonal terms of M and $\Lambda$ are typically sufficient to fit the model to the data. Use of the diagonal form of M is sufficient if $g_{l,i}$ is correlated with $f_{l,i}$ but not with other components of $f_l$, i.e., not with $f_{l,j}$ for $j \neq i$. Use of the diagonal form of $\Lambda$ is sufficient if different components of $g_l$ ($g_{l,i}$ and $g_{l,j}$ for $i \neq j$) are uncorrelated.

The set of parameters is $\theta = \{\pi_a, M_a, \bar{g}_a, \Lambda_a | a = a_0, \ldots, a_L\}$. The maximum log likelihood in Equation (7) is determined by setting the derivatives with respect to the different parameters to zero and solving for the corresponding parameter.

$$\frac{\pi^{t+1}_{a_l,a_{l+1}}}{\sum_{a_l} \cdot \pi^{t+1}_{a_l,a_{l+1}}} = \frac{\sum_x Pr(a_l(x), a_{l+1}(x) | I, \theta^t)}{\sum_x Pr(a_{l+1}(x) | I, \theta^t)} \tag{10}$$

For the other parameters, the update equations may be expressed in a form $<.>_{t,a_l}$ that represents the average over position at level l, weighed by $Pr(a_l(x)|I,\theta^t)$, where:

$$\langle X \rangle_{t,a_l} = \frac{\sum_x Pr(a_l(x) | I, \theta^t) X(x)}{\sum_x Pr(a_l(x) | I, \theta^t)} \tag{11}$$

The other update equations are then expressed as follows:

$$\bar{g}_{a_l}^{t+1} = \langle g_l \rangle_{t,a_l} - M_{a_l}^{t+1} \langle f_{l+1} \rangle_{t,a_l} \tag{12}$$

$$M_{a_l}^{t+1} = (\langle g_l f_{l+1}^T \rangle_{t,a_l} - \bar{g}_{a_l}^{t+1} \langle f_{l+1}^T \rangle_{t,a_l}) \times \langle f_{l+1} f_{l+1}^T \rangle_{t,a_l}^{-1} \tag{13}$$

$$\Lambda_{a_l}^{t+1} = \langle (g_l - M_{a_l}^{t+1} f_{l+1} - \bar{g}_{a_l}^{t+1})(g_l - M_{a_l}^{t+1} f_{l+1} - \bar{g}_{a_l}^{t+1})^T \rangle_{t,a_l} \tag{14}$$

$$= \langle (g_l - M_{a_l}^{t+1} f_{l+1})(g_l - M_{a_l}^{t+1} f_{l+1})^T \rangle_{t,a_l} - \bar{g}_{a_l}^{t+1} (\bar{g}_{a_l}^{t+1})^T \tag{15}$$

However, $\bar{g}_{a_l}^{t+1}$ and $M_{a_l}^{t+1}$ in Equations (12) and (13) are mutually dependent. Inserting Equation (12) into Equation (13) obtains $M_{a_l}^{t+1}$ as follows $$M_{a_l}^{t+1} = (\langle g_l f_{l+1}^T \rangle_{t,a_l} - \langle g_l \rangle_{t,a_l} \langle f_{l+1}^T \rangle_{t,a_l})(\langle f_{l+1} f_{l+1}^T \rangle_{t,a_l} - \langle f_{l+1} \rangle_{t,a_l} \langle f_{l+1}^T \rangle_{t,a_l})^{-1} \tag{16}$$

Thus the update procedure to determine the parameters at step t+1 is to compute $M_{a_l}^{t+1}$ in Equation (16), compute $\bar{g}_{a_l}^{t+1}$ in Equation (12), and compute $\Lambda_{a_l}^{t+1}$ in Equation (14).

Assuming that diagonal terms in M and $\Lambda$ are sufficient, the off-diagonal terms in these expressions can be ignored. In fact, the component densities $N(g, M_a f + \bar{g}_a, \Lambda_a)$ factor into individual densities for each component of subsampled feature vector g. In this case, Equations 16, 12 and 14 are replaced with scalar versions, and independently applied to each component of g.

The M-step requires a prior determination of the log-likelihood function in the E-step. To determine this log-likelihood function, Equation 7 requires computing the probabilities of pairs of labels from neighboring layers of the label pyramid, $Pr(a_l(x_l), a_{l+1}(x_l)|I,\theta^t)$ and $Pr(a_l(x_l)|I,\theta^t)$ for given image data. These probabilities appear in both of numerator and denominator of all the parameter update or re-estimation equations in Equations 10, 12, 14 and 16. However, in the E-step, these probabilities are only needed up to an overall factor, which can be chosen as $Pr(I|\theta^t)$. Applying the factor alters the computation of $Pr(a_l(x_l), a_{l+1}(x_l)|I,\theta^t)$ and $Pr(a_l(x_l)|I,\theta^t)$ into respective terms $Pr(a_l(x_l), a_{l+1}(x_l)|I,\theta^t)$ and $Pr(a_l(x_l)|I,\theta^t)$ This is shown in Equations 17A and 17B as follows:

$$Pr(a_l(x), a_{l+1}(x) | I, \theta^t) Pr(I|\theta^t) = Pr(a_l(x), a_{l+1}(x), I|\theta^t) = \sum_{A \setminus a_l(x), a_{l+1}(x)} Pr(I, A|\theta^t) \tag{17A}$$

$$Pr(a_l(x)|I, \theta^t) Pr(I|\theta^t) = Pr(a_l(x), I|\theta^t) = \sum_{A \setminus a_l(x)} Pr(I, A|\theta^t) \tag{17B}$$

Figure 5:
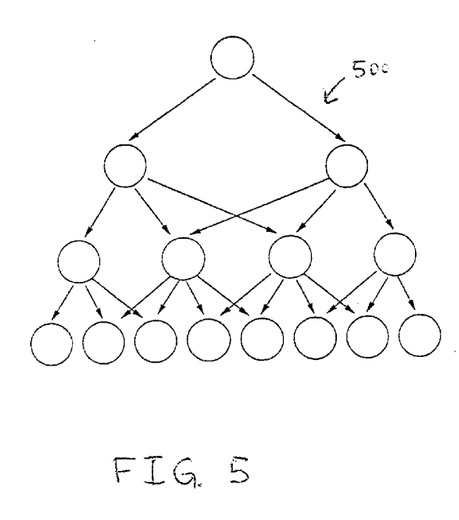
FIG. 5 illustrates a label pyramid having an unrestricted tree structure.
Figure 6:
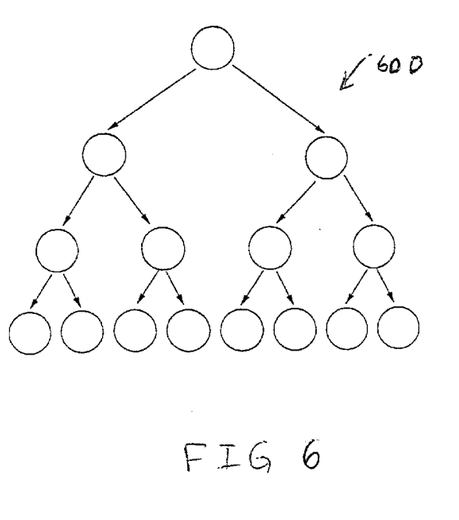
FIG. 6 illustrates a label pyramid having a restricted tree structure.

The complexity in determining the sums in Equations 17A and 17B depends upon the structure of the hidden variables in the label pyramid. FIGS. 5 and 6 show two such structures of the label pyramid. Namely, the complexity or cost of evaluating these sums in Equations 17A and 17B grows exponentially with the size of a clique, but only grows linearly with the number of cliques. If the label pyramid structure restricts the conditioning of each label on only one label from a parent layer, such as the structure 600 in FIG. 6, then the clique size is minimal. Note that FIG. 6 represents a simplified label pyramid for a one-dimensional image, where each label has two children. In the usual case of two-dimension images, the image pyramid is generated from the image by subsampling-by-two in two directions, and the corresponding label pyramid has a quad-tree structure. In such a quad-tree, a label $x_l$ in layer 1 has only one parent $Par(x_l)$ in layer l+1 and four children $Ch(x_l)$ in layer l-1.

However, if the label pyramid structure is unrestricted such that every location in layer l is connected to every neighboring pixel in layers l+1 and l-1, as in the structure 500 in FIG. 5, then the entire label pyramid becomes one irreducible clique. In this case, the exact evaluation of the sums becomes computationally prohibitive.

Since the E-step involves computing the probability of hidden variables or labels given the image pyramid, the probabilities of observations over the entire label pyramid needs to be propagated to particular pairs of labels. To propagate these probabilities, the HIP module 240 needs to compute upward and downward probabilities. As such, the HIP module 240 executes the E-step of the EM method to recursively propagate the probabilities upward and then propagate the probabilities downward to the particular pair of labels. The upward and downward probabilities of the child and parent labels are recursively defined as follows:

$$u_l(a_l, x) = Pr(g_l(x) | f_{l+1}(x), a_l) \prod_{x' \in Ch(x)} \tilde{u}_{l-1}(a_l, x') \tag{18}$$

$$\tilde{u}_l(a_{l+1}, x) = \sum_{a_l} Pr(a_l \mid a_{l+1}) u_l(a_l, x) \quad (19)$$

$$d_l(a_l, x) = \sum_{a_{l+1}} Pr(a_l \mid a_{l+1}) \tilde{d}_l(a_{l+1}, x) \quad (20)$$

$$\tilde{d}_l(a_{l+1}, x) = \frac{u_{l+1}(a_{l+1}, Par(x))}{u_l(a_{l+1}, x)} d_{l+1}(a_{l+1}, Par(x)) \quad (21)$$

where $u_l(a_l, x)$ is the upward probability of the child label $a_l$, $\tilde{u}_l(a_{l+1}, x)$ is the upward probability of the parent label $a_{l+1}$, $d_l(a_l, x)$ is the downward probability of the child label $a_l$, $\tilde{d}_l(a_{l+1}, x)$ is the downward probability of the parent label $a_{l+1}$, Ch(x) is a set of child pixels of a pixel at position x, x' is the position within the set of child pixels Ch(x), and Par(x) is the parent pixel of the pixel at position x.

In Equations 18 and 19, the upward probabilities are initialized at pyramid level l=0, where $u_0(a_0, x) = Pr(g(x) \mid f_1(x), a_0)$. These probabilities are recursively computed up to the l=L, the highest pyramid level, where the non-existent label $a_{L+1}$ is considered a label with a single possible value, and the conditional probability $Pr(a_L \mid a_{L+1})$ turns into a prior $Pr(a_L)$. The upward probability at l=L reduces to $\tilde{u}_L(a_{L+1}, x) = \tilde{u}_L(x)$. The pixels at layer L are assumed independent, since any further dependencies beyond layer L are not modeled.

Additionally, the product of all $u_L(x)$ coincides with the total image probability such that:

$$Pr(I \mid \theta^t) = \prod_{x \in I_L} \tilde{u}_L(x) = u_{L+1} \quad (22)$$

In Equations 20 and 21, the downward probabilities are determined from the upper pyramid level l=L, where $\tilde{d}_{L+1}(a_{L+1}, x)$ turns into $\tilde{d}_{L+1}(x) = 1$. The downward probabilities are then recursively computed down to l=0.

Using the above upward and downward probabilities, the $Pr(a_l(x), a_{l+1}(x), I \mid \theta^t)$ and $Pr(a_l(x), I \mid \theta^t)$ reduce to:

$$Pr(a_l(x), a_{l+1}(x), I \mid \theta^t) = u_l(a_l, x) \tilde{d}_l(a_{l+1}, x) Pr(a_l \mid a_{l+1}) \quad (23)$$

$$Pr(a_l(x), I \mid \theta^t) = u_l(a_l, x) d_l(a_l, x) \quad (24)$$

The above probabilities are then used in Equation 17 to determine the probability of hidden variables given the image pyramid, $Pr(a_l(x_l) \mid I, \theta^t)$, and $Pr(a_l(x_l), a_{l+1}(x_l) \mid I, \theta^t)$. These probabilities are then used in the M-step to parameterize the probabilities in Equation 7 through the use of update equations 10, 12, 14 and 16.

Figure 7:
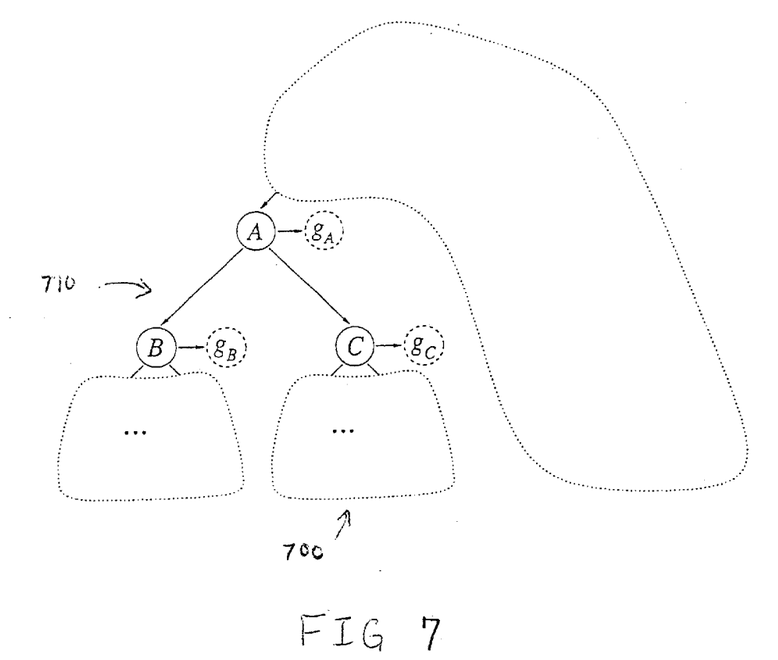
FIG. 7 illustrates a subgraph of a label pyramid.

The derivation of the upward and downward probabilities, as used in E-step of the EM method, is described in further detail below. Consider a subgraph 710 of a label pyramid 700 in FIG. 7. Every node X on the subgraph 710 can take on a discrete number of values. The term $\Sigma_x$ refers to the sum over those values. Each node has an evidence node $g_x$ assigned thereto, where the evidence node having a fixed value for given image data. The term $g_x \ldots$ refers to $g_x$ and all the evidence in the rest of the graph that can be reached through node X. The entire evidence provided by the image intensities of an image is the collection $\{g_A \ldots, g_B, \ldots, g_C \ldots\}$.

The desired probability required in the E-step of the EM method has the form:

$$Pr(B, A, I) = Pr(B, A, g_A \ldots, g_B \ldots, g_C \ldots) \quad (25)$$

$$= Pr(A, g_A \ldots, g_C \ldots) Pr(B, g_B \ldots \mid A) \quad (26)$$

$$= Pr(A, g_A \ldots, g_C \ldots) Pr(B \mid A) Pr(g_B \ldots \mid B) \quad (27)$$

$$= d_B(A) Pr(B \mid A) u(B) \quad (28)$$

where A is the parent node, B is the one child node of A, C is another child node of A, $d_B(A)$ is defined in Equation 38 and u(B) is defined in Equation 29.

In determining Equation 26 from Equation 25, note that subgraph of the label pyramid in FIG. 5. That is, if conditioned on parent node A, the evidence coming through the children of A is independent from the rest of the tree beyond A. Since the children of node A have no other parent, all the probabilistic influence beyond that parent edge, i.e., the line connecting node A to its parent, can only be communicated through the parent node A. To determine Equation 27, note that the evidence $g_B$ is similarly independent from the children of node B, if conditioned on B. Finally, to determine Equation 28, the following definitions are used for recursively computing probabilities in upward and downward probability propagations as follows:

$$u(A) \equiv Pr(g_A, g_B \ldots, g_C \ldots \mid A) \quad (29)$$

$$= Pr(g_A \mid A) Pr(g_B \ldots \mid A) Pr(g_C \ldots \mid A) \quad (30)$$

$$= Pr(g_A \mid A) u_B(A) u_C(A) = Pr(g_A \mid A) \prod_{X \in Ch(A)} u_X(A) \quad (31)$$

$$u_B(A) \equiv Pr(g_B \ldots \mid A) \quad (32)$$

$$= \sum_B Pr(B \mid A) Pr(g_B \ldots \mid B) \quad (33)$$

$$= \sum_B Pr(B \mid A) u(B) \quad (34)$$

Note that labels or hidden variables are conditionally independent, i.e, any label and evidence node connected to node A become independent when conditioned on A. The conditional independence when conditioning on nodes A and B were used to reduce Equations 29 and 32 to Equations 32 and 33 respectively. Equation 29 for node B was used to obtain Equation 34 from Equation 33. Equation 32 was used to obtain Equation 31 from Equation 30.

$$d_B(A) = Pr(A, g_A \ldots, g_C \ldots) \quad (35)$$

$$= Pr(g_C \ldots \mid A) Pr(A, g_A \ldots) \quad (36)$$

$$= \frac{u(A)}{u_B(A)} d(A) \quad (37)$$

$$d(B) = Pr(B, g_A \ldots, g_C \ldots) \quad (38)$$

$$= \sum_A Pr(B \mid A) Pr(A, g_A \ldots, g_C \ldots) \quad (39)$$

-continued $$= \sum_A Pr(B|A) d_B(A) \quad (40)$$

The conditional independence when conditioning on node A was similarly used to determine Equations 36, 37 and 39. Equation 35 was used to determine Equation 40 from Equation 39.

Although the above description contemplates one set of labels A, additional sets of labels are possible. This changes the conditional dependency of the labels or hidden variables on each other. For example, the subsampled feature vectors $g_l$ are conditioned upon a new set of hidden variables B, one label $b_l(x)$ per pixel x and at level l, and the label $b_l(x)$ is conditioned on $a_l(x)$ only. The labels $a_l(x)$ still condition each other in a coarse-to-fine hierarchy, but only condition the label $b_l(x)$ directly rather than the feature vectors. The new labels B operate as labels for kinds of image feature vectors, while the hierarchical labels A operate as labels for higher-level objects or groups of image structures.

Other hidden variable structures are also contemplated within the scope of the invention. For example, the labels A may have a structure that is not a tree. However, this would result in a dense graph, similar to FIG. 5, and training of such a structure would be computationally expensive. Additionally, the hidden variables may be continuous hidden instead of discrete. This would require integration over these variables, which would also be computationally difficult.

The resulting image probability distribution in Equations 2 and 3 captures the long-range dependencies, and allows factoring of the distributions over position. This factoring greatly simplifies the HIP modeling problem. Moreover, this image probability distribution captures the true distribution of images including the appearance of more structured objects.

Returning to FIG. 2, the object processor 250 receives the image probability distribution to perform object detection on the input image. For example, in the case of mammography, the object processor 250 receives an image probability distribution trained on examples of images having tumors and another image probability distribution trained on examples of images without tumors. To classify a new image, the object classifier 250 may use these two image probability distributions to determine the probability distribution at the new image according to the two model probability distributions. Namely, the object classifier 250 determines the probability of the image according to the tumor image model and the probability of the image according to the non-tumor image model. If the ratio of these distributions, Pr(image|tumor)/Pr(image|non-tumor) exceeds some predefined threshold, then the image is detected as having a tumor. In another embodiment, the object processor 250 may perform object recognition or tumor detection using only one image probability distribution.

Although various embodiments which incorporate the teachings of the present invention have been shown and described in detail herein, those skilled in the art can readily devise many other varied embodiments that still incorporate these teachings. For example, the objector detector 110 may identify multiple classes, i.e., more than two, of objects. Additionally, the image probability distribution of the current invention can be adapted to other image processing functions including compression, noise suppression, resolution enhancement, interpolation and fusion of multiple images.

What is claimed is:

1. A method for computing an image probability distribution for an image, the image containing local and non-local information, said method comprising the steps of:
   (a) decomposing the image into a feature pyramid and a subsampled feature pyramid to model local information in the image;
   (b) modeling non-local information in the image with a plurality of labels;
   (c) computing the image probability distribution using said plurality of labels and at least one of said feature pyramid and said subsampled feature pyramid; and
   (d) performing image processing on the image using the computed image probability distribution.

2. The method of claim 1, wherein said decomposing step (a) comprises the steps of:
   (a1) decomposing the image into a low-pass pyramid having a plurality of levels; and
   (a2) extracting features at each level of said low-pass pyramid to create said feature pyramid having a plurality of levels corresponding to said plurality of levels of said low-pass pyramid.

3. The method of claim 2 wherein said low-pass pyramid is a gaussian pyramid.

4. The method of claim 1 wherein said computing step (c) comprises the step of (c1) factoring the image probability distribution over said plurality of labels and at least one position at each level in at least one of said feature pyramid and said subsampled feature pyramid.

5. The method of claim 4, wherein said computing step (c) is performed in accordance with:

$$Pr(I) \propto \sum_A \left\{ \prod_{l=0}^{L-1} \prod_{x \in I_{l+1}} Pr(g_l(x) | f_{l+1}(x), A) \right\} Pr(I_L | A) Pr(A)$$

where Pr(I) represents the image probability distribution, I represents the image, A represents said plurality of labels, $f_{l+1}(x)$ represents a feature vector at position x of level l+1 of said feature pyramid, $g_l(x)$ represents a feature vector at position x of level l of said subsampled feature pyramid, and L represents the number of levels of said feature and subsampled feature pyramids.

6. The method of claim 1, wherein said plurality of labels is structured as a label pyramid having a plurality of levels.

7. The method of claim 6, wherein each label is conditionally dependent upon a label at the next higher level of said plurality of labels.

8. The method of claim 7, wherein computing step (c) is performed in accordance with:

$$Pr(I) \propto$$

$$\sum_{A_0 \ldots, A_{L-1}} \prod_{l=0}^{L-1} \prod_{x \in I_{l+1}} [Pr(g_l(x) | f_{l+1}(x), a_l(x)) Pr(a_l(x) | a_{l+1}(x))] Pr(I_L)$$

where Pr(I) represents the image probability distribution, I represents the image, $f_{l+1}(x)$ represents a feature vector at position x of level l+1 of said feature pyramid, $g_l(x)$ represents a feature vector at position x of level l of said subsampled feature pyramid, $a_l(x)$ represents said label at position x of level l of said label pyramid, $a_{l+1}(x)$ represents said label at position x of level l+1 of said label pyramid, L represents the number of levels of said feature pyramid and said subsampled feature pyramid, and $A_l$ represents an label image or said plurality of labels at level l of said label pyramid.

9. The method of claim 8, wherein $\Pr(G_l(x)|f_{l+1}(x), a_l(x))$ and $\Pr(a_l(x)|a_{l+1}(x))$ for each level l and position x are determined using at least one parameter, where said at least one parameter is matched to the image with an EM (expectation-maximization) method.

10. The method of claim 1 wherein said performing step (d) comprises the steps of:
   (d1) associating image probability distributions for at least two classes; and
   (d2) identifying an object in the image if the image probability distribution of one of at least two classes exceeds a threshold level.

11. The method of claim 1 wherein said performing step (d) comprises the step of (d1) allocating fewer bits at images having a higher image probability distribution.

12. The method of claim 1 wherein said performing step (d) comprises the steps of:
   (d1) detecting the presence of noise in the image; and
   (d2) estimating a refined image with said noise removed.

13. A method for detecting an object in an image having local and non-local information, said method comprising the steps of:
   (a) decomposing the image into a feature pyramid and subsampled feature pyramid to model local information in the image;
   (b) implementing a plurality of labels to model non-local information in the image;
   (c) computing an image probability distribution from said feature pyramid, said subsampled feature pyramid and said plurality of labels; and
   (d) detecting the object in the image using the image distribution.

14. The method of claim 13 wherein said computing step (c) comprises the step of (c1) factoring the image probability distribution over said plurality of labels and at least one position at each level in at least one of said feature pyramid and said subsampled feature pyramid.

15. The method of claim 13 wherein said computing step (c) is performed in accordance with:

$$Pr(I) \propto \sum_A \left\{ \prod_{l=0}^{L-1} \prod_{x \in l_{l+1}} Pr(g_l(x) | f_{l+1}(x), A) \right\} Pr(I_L | A) Pr(A)$$

where Pr(I) represents the image probability distribution, I represents the image, A represents said plurality of labels, $f_{l+1}(x)$ represents a feature vector at position x of level l+1 of said feature pyramid, $g_l(x)$ represents a feature vector at position x of level l of said subsampled feature pyramid, and L represents the number of levels of said feature and subsampled feature pyramids.

16. The method of claim 13 wherein said detecting step (d) comprises the steps of:
   (d1) associating image probability distributions for at least two classes; and
   (d2) identifying an object in the image if the image probability distribution of one of at least two classes exceeds a threshold level.

17. An apparatus for detecting objects in an image having local and non-local information, said apparatus comprising:
   a pyramid generator for generating a feature pyramid and a subsampled feature pyramid from the input image;
   a hierarchical image probability (HIP) module, coupled to said pyramid generator, for implementing a plurality of labels to model non-local information in the image, and computing a image probability distribution from said feature pyramid, said subsampled feature pyramid and said plurality of labels; and
   an object processor, coupled to said HIP module, for detecting objects in the image from said image distribution.

18. A computer-readable medium having stored thereon a plurality of instructions, the plurality of instructions which, when executed by a processor, cause the processor to perform the steps comprising of:
   decomposing an image containing local and non-local information into a feature pyramid and a subsampled feature pyramid, where at least one of said feature pyramid and said subsampled feature pyramid models local information in said image;
   modeling non-local information in said image with a plurality of labels;
   computing the image probability distribution using said plurality of labels and at least one of said feature pyramid and said subsampled pyramid; and
   performing image processing on said image using the computed image probability distribution.

* * * * *